Jan. 27, 1953 A. WESLEY 2,626,408
COMBINED INNERSPRING AND RUBBER MATTRESS
Filed Sept. 14, 1950
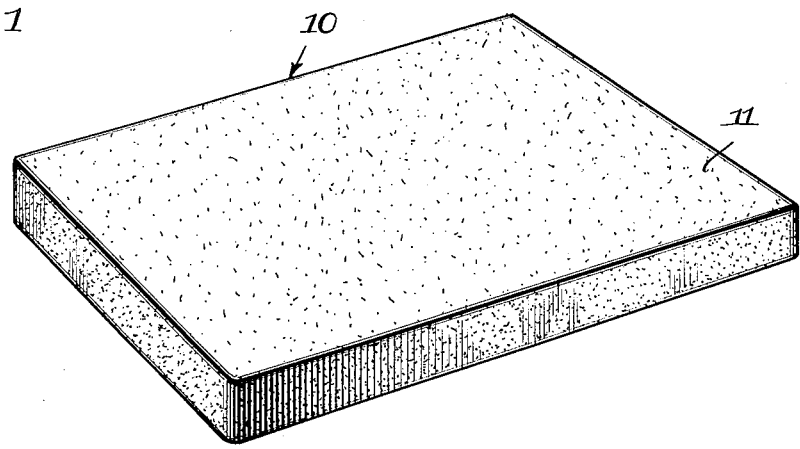
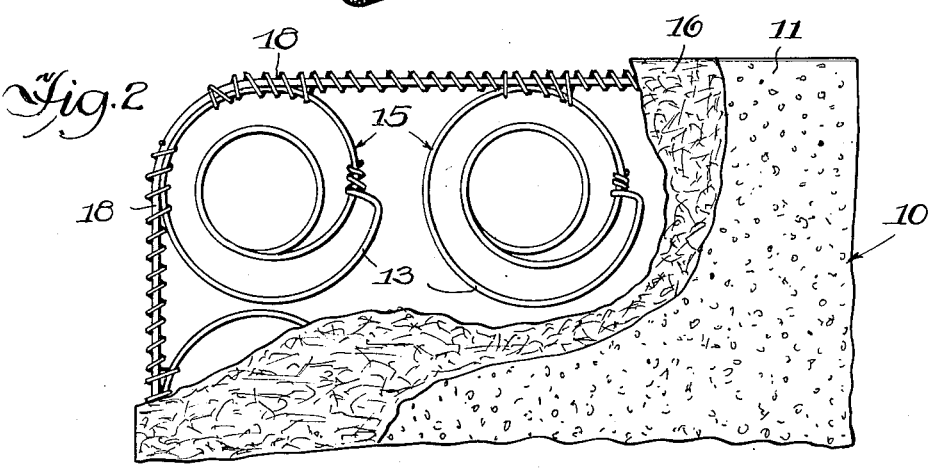
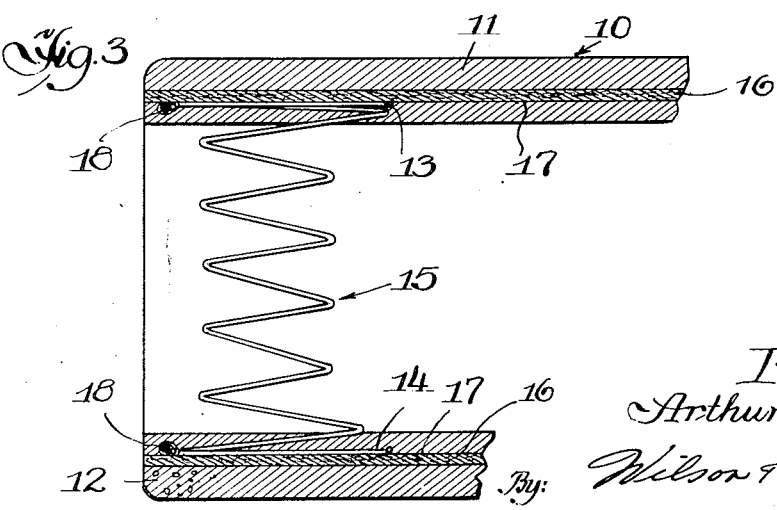
Inventor,
Arthur Wesley,
By Wilson & Geppard
Attys.

Patented Jan. 27, 1953

2,626,408

UNITED STATES PATENT OFFICE 2,626,408

COMBINED INNERSPRING AND RUBBER MATTRESS

Arthur Wesley, Palos Park, Ill., assignor to Burton-Dixie Corporation, Chicago, Ill., a corporation of Delaware Application September 14, 1950, Serial No. 184,853

7 Claims. (Cl. 5—351)

The present invention relates to a mattress and more particularly to a novel innerspring and foam rubber mattress construction and assembly, and in the novel means and manner of reinforcing the foam rubber and supporting the ends of the coils embedded in the rubber.

Among the objects of the present invention is the provision of a novel combined innerspring and rubber mattress and in the novel means and manner of mounting and retaining the ends of the innerspring coils in the rubber slab of the mattress.

A further object of the present invention is the provision of a novel means and manner of constructing an innerspring mattress having an exterior surface or cushioning slab of foam rubber in which the ends of the innerspring coils are embedded, whereby to greatly enhance the strength and prolong the life of the foam rubber and to support and securely retain the ends of the springs against displacement or loosening while augmenting or enhancing the desirable flexing characteristics of the assembly.

Another object and important feature of the present invention is the provision in combination innerspring and foam rubber mattress of a reinforcing pad of sisal fibers embedded in the foam rubber forming the exterior covering and with the ends of the innerspring coils abutting or engaging the adjacent surface of this pad whereby the ends of the coils are held securely in place and the life of the mattress is thereby prolonged.

The invention further comprehends the provision of a novel innerspring mattress having an upper and a lower slab or covering of foam rubber and a strengthening layer of fibrous material embedded in the foam rubber for securely and permanently anchoring and retaining the ends of the innerspring coils in operative position within the rubber and without impairing the flexible characteristics of the assembly.

A further object of the present invention is the provision of a novel innerspring and rubber mattress construction comprising in combination innerspring coils having their separate ends embedded in the upper and lower surface slabs of rubber or resilient material, and a pad or layer composed of sisal fibers reinforcing the rubber and having one side coated or covered with a rubber latex against which the ends of the coils seat or engage whereby the coils are securely retained therebetween in assembled relation.

A still further object of the present invention is the provision of a novel mattress assembly composed of separate inner spring coils having their opposite ends embedded in slabs, layers or laminae of foam rubber each reinforced by an intermediate pad, layer or lamina of sisal fibers coated on one surface with a rubber latex against which the ends of the coils are seated and whereby these ends are retained against displacement.

The present invention further comprehends the provision of a novel innerspring mattress in which the adjacent coils in the body of the mattress are not connected or tied together but are mounted in spaced relation and in such manner that the general physical comfort of the occupant is greatly enhanced.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in perspective of a novel mattress constructed in accordance with the present invention.

Fig. 2 is a fragmentary, enlarged top plan view of one corner of the novel mattress assembly, portions of the top and intermediate layers or laminae being broken away to more completely show the inner construction.

Fig. 3 is a fragmentary, enlarged view in vertical cross section through the mattress and showing the manner of constructing and the assembly of the novel mattress with the ends of the innerspring coils projecting into and embedded in the foam rubber of the cushioning slabs and seating against a pad or layer of fibrous material embedded in the rubber slabs.

Referring more particularly to the disclosure in the drawing and to the novel illustrative embodiment therein shown, the present invention comprehends the provision of a combined innerspring and rubber mattress 10 comprising upper and lower slabs or layers of a resilient cushioning material 11 and 12 such as foam rubber and in which slabs the opposite ends 13 and 14, respectively, of a plurality of spaced innerspring coils 15 are embedded. As these coils are subjected to considerable flexing by the occupant of such a mattress, considerable difficulty is experienced in retaining anchored the ends of the coils in the slabs or layers of foam rubber. To obviate this difficulty, the present invention comprehends embedding in the slabs 11 and 12 of foam rubber a pad, layer or lamina of strong and durable fibrous material 16 having one of its surfaces or faces 17 coated or covered by a surface coating of latex and with the ends 13 and 14 of the innerspring coils 15 seating against or disposed in contact with the latexed side or face 17 of the fibrous pad 16.

The innerspring coils 15 are shown spaced apart and devoid of any interconnection except by means of a conventional spiral border wire 18 connecting the coils defining the outer contour of the mattress whereby the completed unit or assembly will maintain its predetermined shape and dimensions.

I have found that by fabricating a fibrous pad or layer 16 of sisal fibers to the surface 17 of which a coating of latex has been applied and embedding this pad or layer within the slabs of foam rubber 11 and 12 to provide a laminated cushioning material in which the ends 13 and 14 of the coils 15 abut or seat against the fibrous material, these ends are held and retained securely in position against this latexed surface. Such construction, arrangement and assembly greatly enhances the life of the mattress and the purchaser is assured of a mattress that will continuously afford the occupant optimum physical comfort throughout the life of the article.

Having thus disclosed the invention, I claim:

1. A mattress comprising spaced upper and lower slabs composed of foam rubber and a pad of sisal fibers embedded in the foam rubber, and innerspring coils projecting between said slabs and having their opposite ends embedded in the rubber of the slabs with each end of these coils resting against a pad in the spaced slabs.

2. A mattress comprising spaced upper and lower slabs of foam rubber and a pad of reinforcing fibrous material embedded in said rubber of each of said slabs, and innerspring coils having their opposite ends embedded in the foam rubber of the slabs with an end of the coils in contacting engagement with a pad in each slab.

3. A combined innerspring and rubber mattress having spaced upper and lower slabs and innerspring coils with the opposite ends of the coils embedded in the upper and lower slabs, said slabs comprising rubber and a reinforcing layer of fibrous material embedded within the rubber of each slab to provide a strong and durable surface against which an embedded end of the coils engages and is retained thereby in place.

4. A mattress comprising a plurality of spaced innerspring coils, spaced upper and lower cushioning slabs of foam rubber and a relatively thin reinforcing pad of sisal fibers embedded in the rubber of each slab for strengthening these slabs, an end of each coil being embedded in the rubber and abutting the pad therein.

5. In a combined innerspring and rubber mattress having a plurality of innerspring coils, an upper and a lower laminated covering for the mattress composed of spaced layers of foam rubber and a stratum of a strong and durable fibrous material embedded within each layer of foam rubber for reinforcing the foam rubber, said coils projecting between the upper and lower covering and having their opposite ends embedded in the layers of rubber and bearing against the strata of fibrous material therein.

6. A combined innerspring and rubber mattress comprising a plurality of innerspring coils, spaced upper and lower cushioning slabs of foam rubber and a reinforcing pad of sisal fibers embedded in the rubber of each slab, the opposite ends of said coils being embedded in the rubber of the upper and lower slabs and resting against the reinforcing pads, and a latex coating on the face of the reinforcing pads adjacent the ends of the coils.

7. In combination, an innerspring and foam rubber mattress comprising spaced surface slabs of foam rubber and a relatively thin pad of sisal fibers embedded in the foam rubber of each slab, innerspring coils having an end of the coils embedded in the foam rubber of each of the spaced slabs, and a covering of latex on a surface of each pad, said pads having their latex covered surface facing the opposite ends of the coils and providing spaced abutments against which the ends of the coils rest.

ARTHUR WESLEY.

REFERENCES CITED

The following references are of record in the file of this patent:

UNITED STATES PATENTS

| Number | Name | Date |
|---|---|---|
| 1,835,212 | Fowler | Dec. 8, 1931 |
| 2,194,569 | Rumpf | Mar. 26, 1940 |
| 2,247,543 | Bernstein | July 1, 1941 |
| 2,398,237 | Marsack | Apr. 9, 1946 |
| 2,512,007 | Benda | June 20, 1950 |

FOREIGN PATENTS

| Number | Country | Date |
|---|---|---|
| 853,727 | France | Dec. 7, 1939 |